US011939220B2

(12) United States Patent
Howard et al.

(10) Patent No.: US 11,939,220 B2
(45) Date of Patent: Mar. 26, 2024

(54) NANOMATERIAL PREPARATION METHOD

(71) Applicant: UCL BUSINESS LTD, London (GB)

(72) Inventors: Chris Howard, London (GB); Rhodri Jervis, London (GB); Daniel Brett, London (GB); Gyen Angel, Hertfordshire (GB); Patrick Cullen, London (GB); Chris Gibbs, Suffolk (GB)

(73) Assignee: UCL BUSINESS LTD, London (GB)

( * ) Notice: Subject to any disclaimer, the term of this patent is extended or adjusted under 35 U.S.C. 154(b) by 484 days.

(21) Appl. No.: 16/969,955

(22) PCT Filed: Feb. 13, 2019

(86) PCT No.: PCT/EP2019/053521
§ 371 (c)(1),
(2) Date: Aug. 13, 2020

(87) PCT Pub. No.: WO2019/158569
PCT Pub. Date: Aug. 22, 2019

(65) Prior Publication Data
US 2020/0407227 A1 Dec. 31, 2020

(30) Foreign Application Priority Data

Feb. 13, 2018 (GB) ...................................... 1802316

(51) Int. Cl.
C01B 32/194 (2017.01)
B01J 21/18 (2006.01)
(Continued)

(52) U.S. Cl.
CPC ............. *C01B 32/194* (2017.08); *B01J 21/18* (2013.01); *B01J 23/42* (2013.01); *B01J 35/0013* (2013.01);
(Continued)

(58) Field of Classification Search
CPC ..... C01B 32/194; C01B 32/19; C01B 32/225; B01J 21/18; B01J 23/42; B01J 35/0013;
(Continued)

(56) References Cited

U.S. PATENT DOCUMENTS 4,614,692 A 9/1986 Kajiyama et al.
11,105,009 B2* 8/2021 Liu ....................... C25B 11/031
(Continued)

FOREIGN PATENT DOCUMENTS

| EP | 3 403 994 | * 11/2018 | ............. C01B 32/00 |
| KR | 2014 0103765 | * 8/2014 | ........... C01B 32/182 |
| WO | WO 2017/125819 | * 7/2017 | ............. C01B 32/19 |

OTHER PUBLICATIONS

Sergio Navalon et al., "Metal nanoparticles supported on two-dimensional graphenes as heterogeneous catalysts." Coordination Chemistry Reviews 312, pp. 99-148. (Year: 2016).*
(Continued)

*Primary Examiner* — Patricia L. Hailey
(74) *Attorney, Agent, or Firm* — Stites & Harbison PLLC; Richard S. Myers, Jr.

(57) ABSTRACT

Described is a method of preparing transition metal nanoparticles on a graphene support, in which a tertiary graphite intercalation compound is provided with intercalated metal ions such that the tertiary graphite intercalation compound comprises a graphene sheet having a negative charge. The graphene sheet is contacted with a transition metal salt to cause reduction of the transition metal salt by the graphene (Continued)

sheet, and to form transition metal nanoparticles. Also described are products arising from the method, and uses of those products.

25 Claims, 13 Drawing Sheets

(51) Int. Cl.

| | | |
|---|---|---|
| *B01J 23/42* | (2006.01) | |
| *B01J 35/00* | (2006.01) | |
| *B01J 37/02* | (2006.01) | |
| *B01J 37/04* | (2006.01) | |
| *B01J 37/16* | (2006.01) | |
| *C01B 32/19* | (2017.01) | |
| *C01B 32/225* | (2017.01) | |
| *H01M 4/86* | (2006.01) | |
| *H01M 4/92* | (2006.01) | |

(52) U.S. Cl.
CPC ........... *B01J 37/0228* (2013.01); *B01J 37/04* (2013.01); *B01J 37/16* (2013.01); *C01B 32/19* (2017.08); *C01B 32/225* (2017.08); *H01M 4/926* (2013.01); *H01M 2004/8689* (2013.01)

(58) Field of Classification Search
CPC ........ B01J 37/0228; B01J 37/04; B01J 37/16; H01M 4/926; H01M 2004/8689
USPC ........................................................ 502/185
See application file for complete search history.

(56) References Cited

U.S. PATENT DOCUMENTS

| | | |
|---|---|---|
| 2013/0081678 A1 | 4/2013 | Naito |
| 2014/0377159 A1 | 12/2014 | Howard et al. |
| 2017/0044683 A1 | 2/2017 | Cullen et al. |

OTHER PUBLICATIONS

Savoia, et al., Applications of potassium-graphite and metals dispersed on graphite in organic synthesis, Pure and Applied Chemistry, 57, (1985), 1887-1896.
Vovchenko, et al., Thermal stability of graphite-Cobalt nanocomposite materials. Inorg. Mater. 42, (2006), 19-23.
Shao, et al. Electrocatalysis on Platinum Nanoparticles: Particle Size Effect on Oxygen Reduction Reaction Activity. Nano. Let. 11 (9), (2011), 3714-3719.
Neiva, et al, Graphene/Nickel Nanoparticles Composites from Graphenide Solutions, J. of Colloid and Interface Science, 453, (2015) 28-35.
Hof, et al. From Food Waste to Efficient Bifunctional Nonprecious Electrocatalyst, Chem. Eur. J. 23, (2017) 15283-15288.
International Search Report for PCT/EP2019/053521 dated May 24, 2019.
Search Report for Application No. GB1802316.8 dated Aug. 31, 2018.

\* cited by examiner

A - Graphite
B - Graphite + K-NH$_3$ solution
C - K-NH$_3$ graphite intercalation compound (GIC)
D – Charged graphene dispersion in THF
E - Reduction of Pt salt by charged graphene
F - Platinum nanoparticles on graphene FIGURE 1 (cont.)

1-1.6 V$_{RHE}$

NANOMATERIAL PREPARATION METHOD

CROSS REFERENCE TO RELATED APPLICATIONS

This application is a §371 National State Application of PCT/EP2019/053521 filed Feb. 13, 2019 which claims priority to GB 1802316.8 filed Feb. 13, 2018.

TECHNICAL FIELD

The present invention relates to a method for producing nanoparticles on graphene, to the graphene-nanoparticle product, and uses thereof.

BACKGROUND

Catalysis is the enhancement of a rate of reaction due to the presence of a material. Catalysts are currently used in a wide range of applications. For example, catalysts are used in fuelled polymer electrolyte membrane/proton exchange membrane (PEM) fuel cells. Here, hydrogen gas is used as a fuel to provide energy. The reaction produces water as the by-product. The presence of catalytic nanoparticles, for example, platinum particles, within a PEM fuel cell promotes both the oxygen reduction reaction (ORR) and hydrogen oxidation reaction (HOR) allowing for the fuel cells to operate at a reasonable rate.

Transition metals are common components for catalytic materials. For example, platinum-containing catalysts are also used in water splitting electrolysers, catalytic converters in cars, and in the oil industry to reform straight-chain alkanes to branched-chain alkanes, cyclohexanes and aromatic hydrocarbons. Ru is often alloyed with Pt to improve the CO poisoning tolerance of fuel cell catalysts. Catalytic converters in the automotive sector use Pt, Pd, Rh and Au, amongst other precious metals. Outside of electrochemical energy devices, precious metal catalysts are widely used for a range of industrial chemical processes, with alloys of Pd—Ru, Rh—Ru and Pt—Ru being used for hydrogenation. Steam reforming of methane to hydrogen widely uses Ni as a catalyst, due to lower cost, though it is less active than the Pt, Pd, Ir, Rh and Ru that are often used in industry. Other industrial processes and products using catalytic nanoparticles are the chlor-alkali process, nitric acid production, monoethylene glycol synthesis, hydrogenation and dehydrogenation reactions, anti-microbial coatings, reinforcement fibre glass manufacture among many others. As another example, Pd-based nanoparticles are used for Suzuki cross-coupling reactions to prepare a wide range of compounds.

The platinum group metals (platinum, palladium, iridium, ruthenium, rhodium, osmium among others) are generally considered to be particularly important catalytic materials. Due to the high cost of these precious metals, much work has gone into maximising the active catalytic surface area available from a certain amount of starting material. One way of achieving this is by creating metal nanoparticles. For example, the ideal platinum nanoparticle diameter for a fuel cell cathode is on the order of 2 nm. (Shao, M et al, Electrocatalysis on Platinum Nanoparticles: Particle Size Effect on Oxygen Reduction Reaction Activity. Nano Let 11 (9), 3714-3719 (2011)).

Transition metals such as iron, cobalt, nickel, tin and others are also important catalytic materials. Active catalytic surface area is also an important fundamental characteristic for these less expensive materials as well.

It is common for catalytic nanoparticles to be supported in use. A number of kinds of catalytic support are available. Commercially available catalytic supports include silicon oxides and carbon supports such as for example carbon blacks like Vulcan XC-72R or Ketjen EJ-300.

It is well known to prepare metal nanoparticles using a reduction agent such as sodium borohydride. The nanoparticles, once formed, attach to the desired support. Some of the problems encountered in these methods include how to achieve optimal nanoparticle size for all nanoparticles, how to achieve homogenous distribution of nanoparticles upon the support, and how to securely attach the nanoparticles to the supports. There are often significant safety considerations when using chemical reducing agents like sodium borohydride and hydrazine, for example, hydrogen gas evolution and toxicity to aquatic life.

Pénicaud et al. have successfully deposited nickel nanoparticles onto graphene. (Zarbin et al, Graphene/Nickel Nanoparticles Composites from Graphenide Solutions, J. of Colloid and Interface Science, 453 (2015), 28-35). The Penicaud technique uses a binary Graphite Intercalation Compound (GIC) prepared using vapour transport and having potassium ions between graphene sheets in the layered GIC. The Pénicaud technique leads to nanoparticles of nickel with an average diameter of about 5 nm.

One of the biggest challenges in heterogeneous catalysis at present is to prevent, inhibit or minimise the agglomeration of catalytic particles over time. Agglomeration leads to a lowering of available catalytic surface area over time and therefore reduced catalytic function. For example, agglomeration occurs in PEM fuel cells during operation and leads to a reduction of the available catalytically active surface area of platinum. As a result, the performance of the fuel cell is gradually lowered. In order to address this, materials that support platinum nanoparticles while preventing this agglomeration are of significant interest.

There is presently a need to provide supported metal nanoparticle catalysts that have improved longevity and stability. It is further desirable to provide a supported metal nanoparticle catalyst wherein the nanoparticles have a highly uniform and small size, and high homogeneity of nanoparticle distribution across the support. The present invention addresses these and other needs.

SUMMARY

In a first aspect, the present invention provides a method for preparing metal nanoparticles on a graphene sheet.

In general, the method of the invention comprises the steps of: providing a graphite intercalation (GIC) compound comprising a graphene sheet having a negative charge; contacting the graphene sheet with a transition metal salt such that the contacting step causes reduction of the transition metal salt by the graphene sheet to form the transition metal nanoparticles.

The GIC used in the method of the invention may be prepared using an electronic liquid. Suitably, a metal-ammonia route may be used (an amine solvent may be used in place of ammonia). The resulting GIC contains both components of the electronic liquid (the metal ions and ammonia or amine molecules) in between the layers of graphene in the GIC. That is, both metal ions and ammonia/amine solvent are intercalated. The GIC used in the present invention may be called a tertiary or ternary GIC and the two are used interchangeably herein.

Thus, the GIC used in the present invention has a relatively low metal ion: carbon ratio. Preferably, the ratio is 1:24. In preferred embodiments, the first transition metal salt comprises Pt, Pd, Ru, Ir, Rh, Os, Ni, Cu, Ti, Zn, Au, Ag and/or Co, and most preferably Pt.

In some embodiments, a plurality of transition metal salts are provided and reduced by the graphene sheet. Advantageously, this permits formation of nanoparticles made up of different transition metals on the same support.

Preferably the method comprises the step of flocculating the graphene-supported transition metal nanoparticles to form a stack. This promotes the formation of a powder-like substance which is potentially easier to store and transport.

An advantage of the present methods is that no additional reducing agent is necessary; for example, there is no need to include a reducing agent such as sodium borohydride and the like.

The graphene bearing a negative charge can preferably be provided in the form of a solution or dispersion.

In some embodiments, formation of more than one kind of transition metal nanoparticle using the methods of the invention can be achieved by having the first transition metal salt present in an amount below a stoichiometric charge on the graphene sheet, such that the contacting step causes reduction of the first transition metal salt by the graphene sheet to form the transition metal nanoparticles which are first transition metal nanoparticles. This is followed in one embodiment by a second contacting step in which the graphene sheet is brought into contact with a second transition metal salt, the second transition metal salt comprising a different transition metal to the first transition metal salt, such that the second contacting step causes reduction of the second transition metal salt by the graphene sheet to form second transition metal nanoparticles.

In some embodiments, nanoparticles each having two kinds of transition metal may be formed on the graphene support using the methods of the invention. In these embodiments, the transition metal nanoparticles produced using the first transition metal salt are first transition metal nanoparticles and the method comprises a further contacting step following the formation of the first transition metal nanoparticles, the further contacting step comprising contacting the graphene sheet with a further transition metal salt; and reducing the further transition metal salt to form further transition metal nanoparticles each comprising at least two transition metals on the graphene sheet.

In some embodiments, the further transition metal nanoparticles comprise an alloy of the at least two transition metals.

In some embodiments, the further transition metal nanoparticles are in the form of a core-shell arrangement such that the transition metal of the first transition metal salt forms a core and the transition metal of the further transition metal salt forms a shell over the core.

In some embodiments, the first transition metal salt is provided in an amount below a stoichiometric charge on the graphene sheet such that following the contacting step the graphene sheet comprising the transition metal nanoparticles retains some charge. In these embodiments, the method can further comprise providing a potential or current to the graphene sheet with the transition metal nanoparticles, and optionally electroplating the graphene sheet with the transition metal nanoparticles.

In a second aspect, the present invention provides products corresponding to the materials prepared according to the first aspect.

Specifically, the second aspect encompasses composite materials comprising a transition metal nanoparticle on a graphene support obtained by any of the above-mentioned methods.

This aspect encompasses a composite material comprising a graphene sheet having a first transition metal nanoparticle and a second transition metal nanoparticle formed thereon, wherein the transition metals of the first and second transition metal nanoparticles are different from each other, and wherein the nanoparticles are prepared by any of the above-mentioned methods.

This aspect also encompasses composite material comprising a graphene sheet having a nanoparticle comprising an alloy of first and second transition metals formed thereon wherein the first and second transition metals are different from each other and wherein the nanoparticles are prepared by any of the above-mentioned methods.

This aspect also encompasses a composite material comprising a graphene sheet having a core-shell nanoparticle formed thereon, the core of the nanoparticle comprising a first transition metal and the shell of the nanoparticle comprising a second transition metal wherein the first and second transition metals are different from each other and wherein the nanoparticles are prepared by any of the above-mentioned methods.

Advantageously, the nanoparticles of any of the composite materials disclosed herein have an average size of less than 4 nm.

Also within the scope of the second aspect is a suspension, dispersion or solution comprising the composite materials prepared as described above.

Also within the scope of the second aspect is a catalyst comprising any of the composite, the suspension, dispersion or solution described above.

In a third aspect, the present invention provides the use of any of the products according to the second aspect in a catalytic reaction.

Particularly noted are the following catalytic reactions: a reduction of $NO_x$; an oxidation of CO to $CO_2$; an oxidation of hydrocarbons to $CO_2$ and water; a hydrogen oxidation reaction; an oxidation reduction reaction; a hydrogen evolution reaction; an oxygen evolution reaction; the chlor-alkali process; nitric acid production; monoethylene glycol synthesis; hydrogenation and dehydrogenation reactions; preparation of anti-microbial coatings; and reinforced fibre glass manufacture.

Thus, the graphene supported materials can be used as electrode materials. The electrode materials comprising the graphene supported nanoparticles of the present invention can be used in applications including energy conversion devices. For example, such electrode materials can be used in applications such as (but not limited to) supercapacitors, fuel cells, and battery materials.

BRIEF DESCRIPTION OF THE FIGURES

FIGS. 6a-c show the cyclic voltammograms measured across the 0.6-1 $V_{RHE}$ accelerated stress test. In FIG. 6a, the values are from graphene supported Pt nanoparticles prepared according to the invention. From darkest to lightest, the lines show initial CV, 10,000 cycles, 20,000 cycles and 30,000 cycles respectively. FIG. 6b shows the normalised ECSA. The circles represent the graphene supported Pt nanoparticles prepared according to the present invention, and the triangles represent commercially available carbon-supported Pt nanoparticles (Pt/C). FIG. 6c shows the polarisation curves from the material of FIG. 6a. The lines from darkest to lightest correspond with those of FIG. 6a. FIGS. 6d-f show data corresponding with FIGS. 6a-c, respectively, but measured across the 1-1.6 $V_{RHE}$ accelerated stress test.

DETAILED DESCRIPTION

Without wishing to be bound by theory, the present inventors believe that in the method of the invention, graphene having a negative charge is capable of acting as a reduction agent in the preparation of metal nanoparticles. That is, the inventors theorize that the charged graphene is capable of reducing a transition metal salt, causing the formation of transition metal nanoparticles. Following a reduction in stoichiometric excess to the charge present on the graphene sheet, the inventors believe that the charged graphene loses its negative charge and forms substantially neutral graphene. There are situations where performing a reduction where the charge on the graphene sheet is in stoichiometric excess to the metal salts to be reduced is possible and advantageous in certain applications. The transition metal nanoparticles are comprised on the surface of the graphene, so that the (substantially uncharged) graphene acts as a conductive/electrode support for the nanoparticles.

The inventors have surprisingly discovered that a method of preparing the composite material of graphene sheet with transition metal nanoparticles (graphene/nanoparticle composite material) with a tertiary GIC starting material and preferably a tertiary metal-ammonia GIC (especially one having a carbon to potassium ratio of 24:1) produces some extraordinary advantages.

A first advantage is that the inventors have found that the metal nanoparticles are remarkably homogenously distributed over the graphene sheet. That is, the metal nanoparticles have a notably consistent spacing across the graphene sheet. See e.g. FIGS. 2(a), 2(b), 2(c) and 3. Such homogeneity for platinum nanoparticles dispersed on graphene sheets has not been achieved using previous methods. The Radial Distribution Function (RDF) measures the typical distance between the particles. The RDF shown in FIG. 2(d) indicates that there some structure to the distribution of Pt nanoparticles. There is a discernible first peak at ~2.5 nm and a smaller second peak at ~4.75 nm. The first peak is believed to be associated with the distance to the first nearest neighbour between the particles. The second peak is believed to be associated with the distance to the second nearest neighbour between the particles. The second peak strongly suggests a homogeneous spacing of the nanoparticles on the graphene support.

A second surprising discovery is that the inventors have found that the metal nanoparticles formed on the graphene have a particularly narrow particle size distribution. This can be seen from e.g. FIGS. 2(a), 2(b), 2(c), 3, 5A and 5B and 7. Such homogeneity is difficult to achieve on catalyst supports using previous methods by those skilled in the art. Particularly, when a graphenide solution made from the tertiary metal-ammonia GIC (carbon to potassium ratio of 24:1) is used to reduce a platinum salt, the platinum particle diameter is tightly distributed around 2 nm (see FIG. 2(c)).

Figure 6:
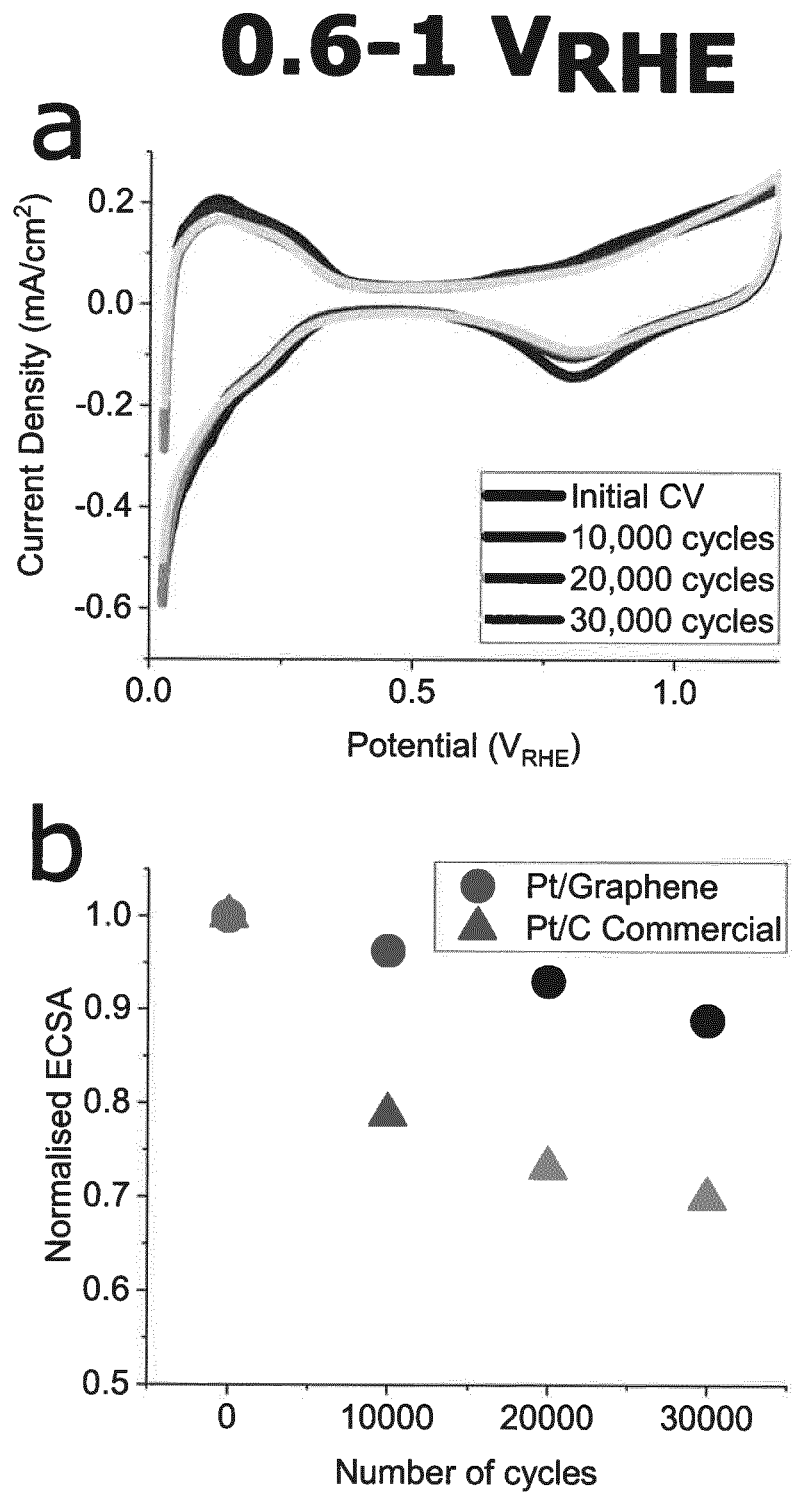
FIG. 6 shows cyclic voltammograms for graphene supported Pt nanoparticles.
Figure 6:
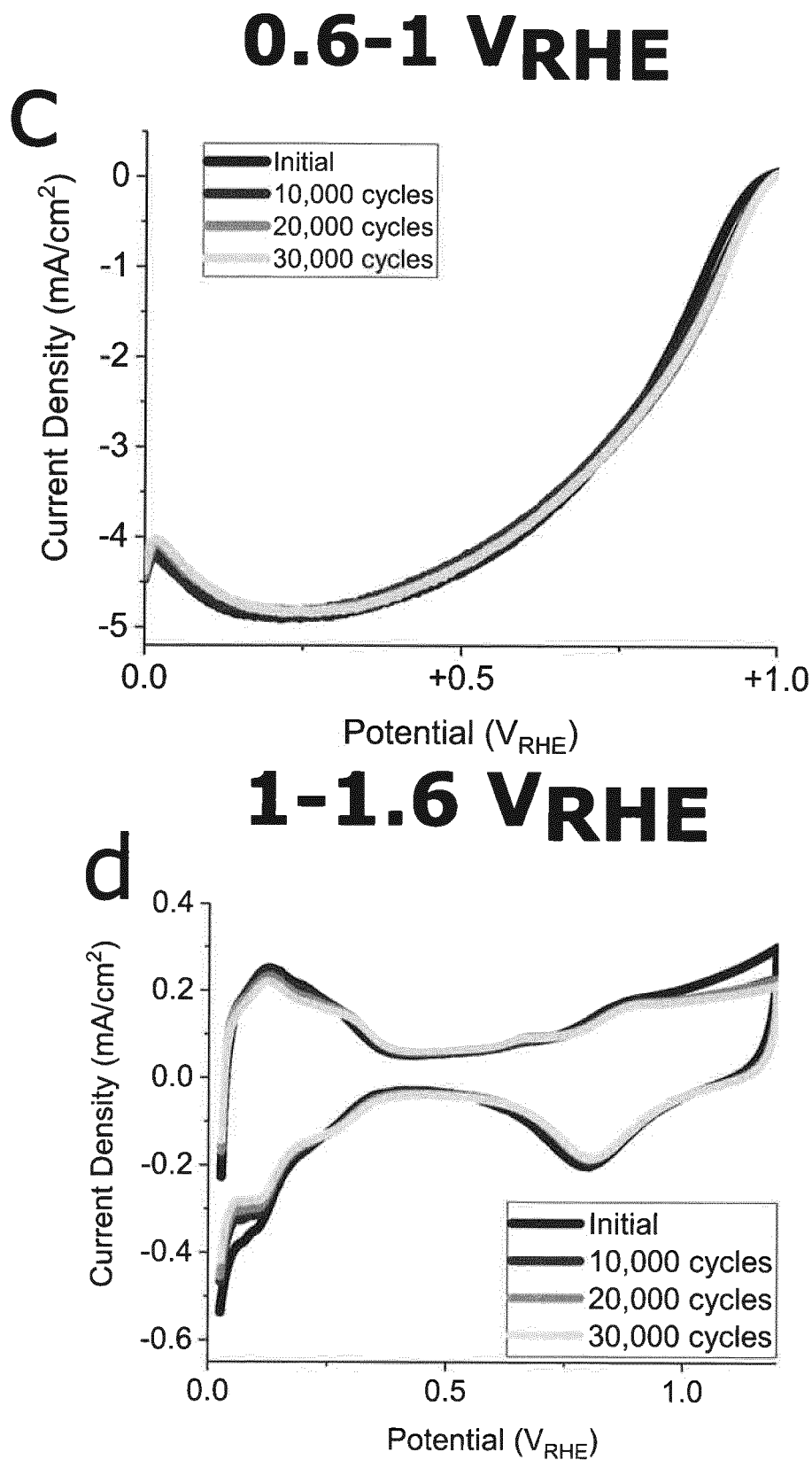
Figure 6:
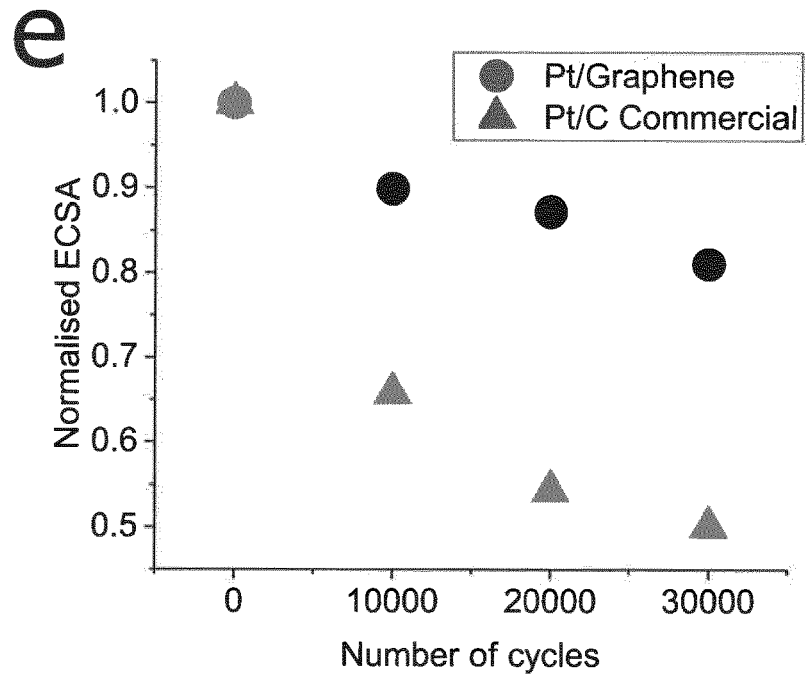
Figure 6:
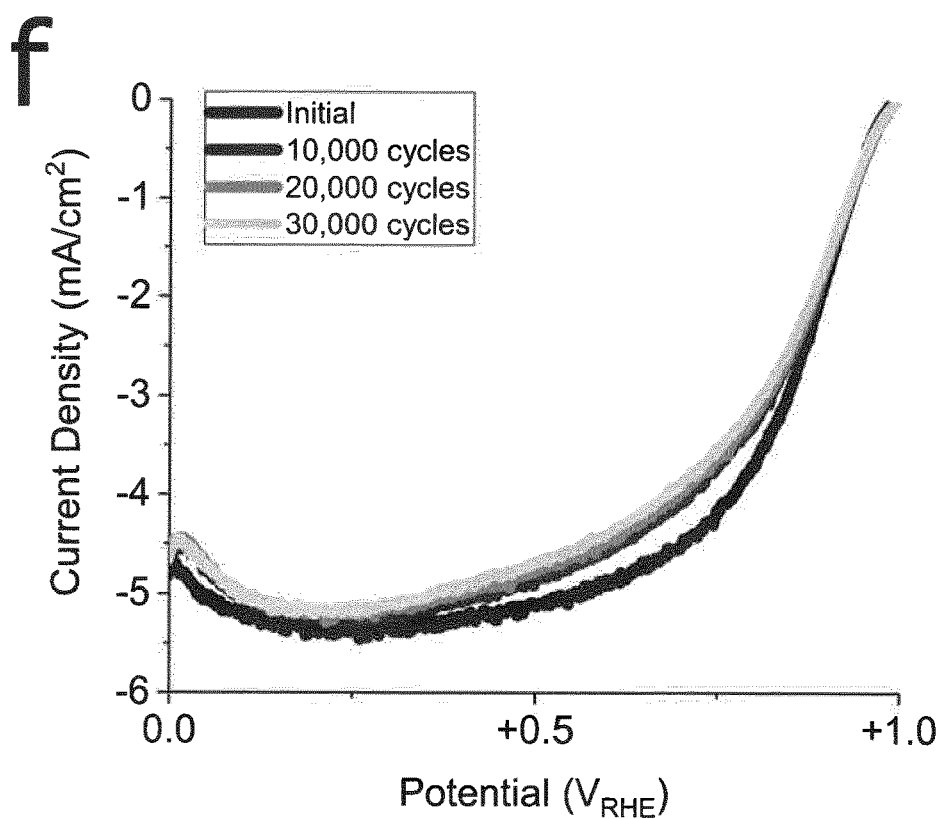
Figure 7:
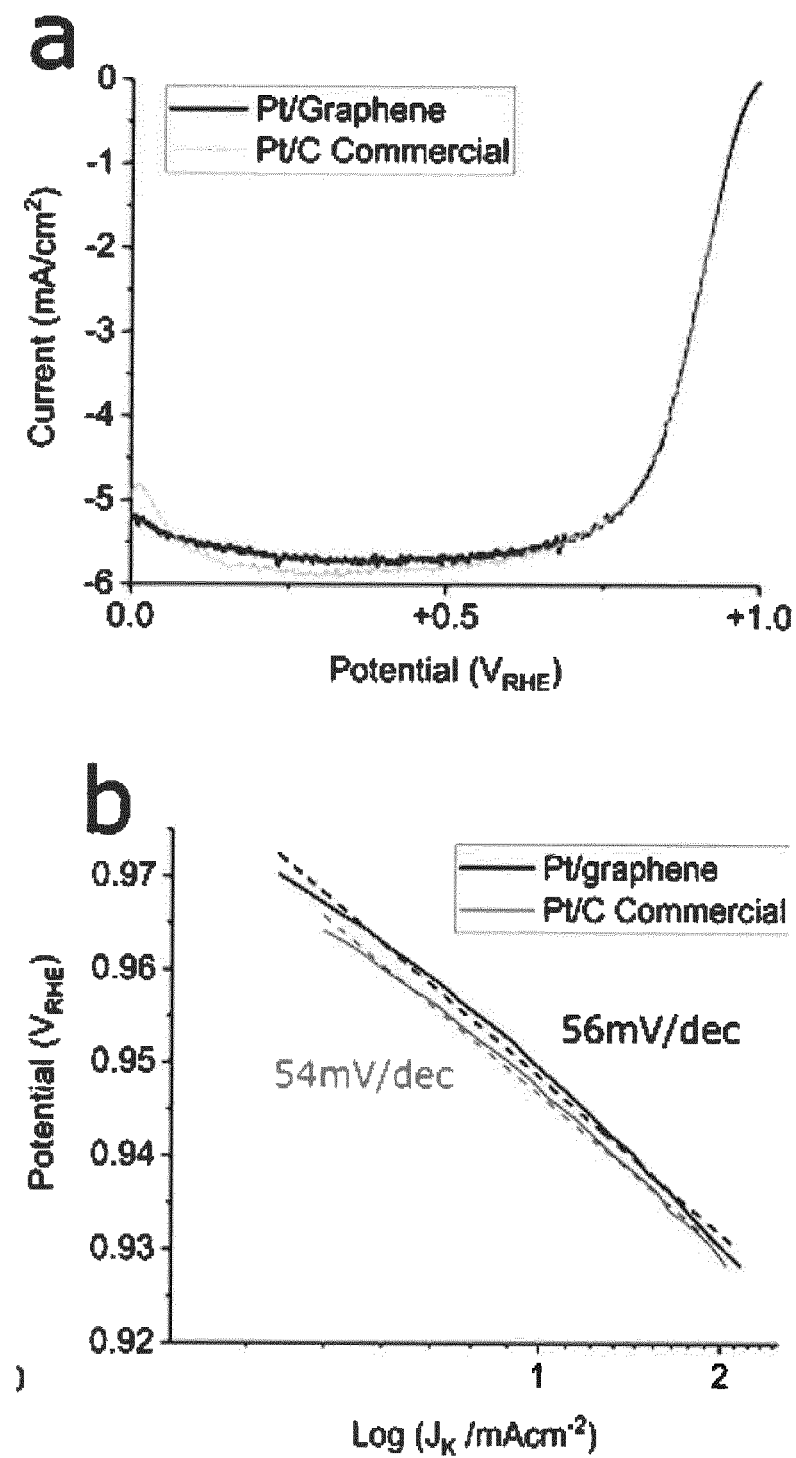
FIG. 7a shows linear sweep voltammograms for ORR in $O_2$-saturated 0.1M $HClO_4$, comparing the activity of graphene-supported Pt nanoparticles prepared according to the invention with a commercial Pt/C catalyst. The rotation rate is 1600 rpm, the scan rate is 20 mVs$^{-1}$.
FIG. 7b shows Tafel plots derived from FIG. 7a. The black lines denote the material of the invention and the grey lines are the commercial product. The slopes are indicated as 56 mV/dec (material of the invention) and 54 mV/dec (commercial comparator).

Thirdly, the inventors have unexpectedly found that the metal nanoparticles produced using the method of the invention have high stability under potential cycling. In particular, the metal nanoparticles show lower mobility (less potential for agglomeration or aggregation) under potential cycling than known materials. This is demonstrated in e.g. FIGS. 4 and 6. This stability and durability is important for practical applications, where it is clearly desirable for nanoparticles to retain their comparatively large surface area.

In particular, the inventors have found that the electrochemical surface area of platinum is lost at a rate ~5× slower than commercial catalysts containing platinum nanoparticles supported on Vulcan XC-72R or Ketjen EJ300 (carbon black) under electrochemical cycling conditions common for these applications. See e.g. FIG. 4C and FIG. 6. This supports the conclusion that the nanoparticles have a lowered tendency to agglomeration. A fourth surprising advantage is that, compared to the known Pénicaud method discussed above, the nanoparticles produced are on average very small in diameter. A preferred embodiment of the current invention uses a tertiary GIC, and particularly one which is prepared using potassium and ammonia. The preferred ratio of carbon to potassium ratio in the GIC used is 24:1. The present inventors carried out an experiment according to the above-mentioned Pénicaud method with nickel acetate except using the tertiary metal-ammonia GIC used in this invention (which has a carbon to potassium ratio of 24:1) instead of the binary GIC used by Pénicaud (which has a carbon to potassium ratio of 8:1). Unexpectedly, it was found that the method of the invention results in a small nickel particle diameter centred on 3 nm (see FIGS. 5A and 5B). In contrast, the Pénicaud prior art reports an average nickel nanoparticle diameter of 5 nm which is substantially larger. Thus, on average, the nanoparticles produced by the present invention are around 2 nm smaller than those produced by the Pénicaud method. This difference in average particle size is significant. Without wishing to be bound by theory, the inventors believe that the intercalation of the second component (e.g. ammonia or amine solvent) provides less room for metal ions than is available for metal ions in the layers of a binary GIC. In turn, this is thought to provide a lower amount of charge donation from the metal ion to the graphene sheets in the GIC used in the invention compared with a binary GIC. That is, the inventors presently theorize that there is less charge density on the graphene sheets of the GIC used in the invention compared to binary GICs, leading to nucleation sites which do not favour agglomeration during the growth phase.

Graphene

Graphene is a two dimensional hexagonal array of carbon atoms. Graphene is known to have some unusual properties compared to other bulk materials. It has shown ballistic transport at room temperature on a micrometre scale, and has a very high surface area.

As used herein, "graphene" or "graphene sheet" means graphene having at least a single layer—one atom thick—of graphite, and up to ten layers of graphite, such as up to eight or up to seven layers. As used herein, "graphenide" means a negatively charged version of graphene. Graphene having between two and ten layers of graphite is sometimes called "few-layer graphene". Preferably, the graphene sheets of the invention have up to five, or up to three layers of graphite. In particularly preferred methods, the graphene sheet is a single layer of graphite.

The graphene sheet used in the formation of the composite graphene/nanoparticle material is provided as a charged graphene. That is, the graphene which is used in the formation of the nanoparticles bears an overall negative charge. See e.g. FIG. 1 for a schematic illustration. It is considered that some of the intercalation sites are filled with $NH_3$ intercalant, and some filled with K intercalant, in the GIC used in the present invention. Some $NH_3$ and some K is expected to be present in each intercalant layer. The preparation of the graphenide of the invention is discussed further below.

The graphenide used in the present process is a tertiary or ternary GIC. As is known in the art, a GIC has a general formula $CX_m$, where the X species is intercalated between the oppositely charged carbon layers. A "binary" GIC is one where there is one guest species X located between the graphene layers. A "ternary" or "tertiary" GIC has the formula $XYC_m$ and has two guest species X and Y located between the graphene layers. In the present invention, a tertiary GIC is used. In this application, the terms "ternary" and "tertiary" are used interchangeably.

The intercalated species of the ternary GIC are preferably components of an electronic liquid. Preferably, these are metal ions and ammonia or amine solvent.

The metal ion is preferably an alkali metal or alkaline earth metal, and most preferably Na or K and ideally K.

The electronic liquid suitable includes ammonia or an amine solvent. Suitably, the amine solvent may include an amine which has at least one hydrocarbon substituent with a carbon chain length of 1 to 6. Primary amine solvents are preferred. Suitably, the amine solvent may be methylamine, ethylamine or propylamine, preferably methylamine.

Preferably, ammonia is intercalated in the GIC used in the invention.

Suitably, the metal ion: carbon ratio of the GIC used in the present invention is up to 1:10, preferably up to 1:15 or up to 1:20. Suitably, the metal ion: carbon ratio of the GIC used in the present invention is at least 1:100, preferably at least 1:50 or at least 1:30. All end-points listed herein can be combined to provide suitable ranges of metal ion: carbon ratio. Suitable exemplary ranges of metal ion: carbon ratio in the GIC used in the present invention include between 1:10 to 1:100, such as 1:15 to 1:50 or 1:15 to 1:30. Particularly preferred is a GIC having a metal ion: carbon ratio of 1:24.

Preferably, the graphenide is provided in the form of a sheet which is one atom thick, though sheets of greater thickness e.g. two, three or four carbon atoms thick, are also useful. Ideally, the graphenide will be one atomic layer thick but embodiments of up to 10 layers will still be useful. Ideally, the graphenide sheets will have planar dimensions between 50 nm and 5000 nm. Preferably, the graphenide is provided as a suspension, solution or dispersion of sheets of desired thickness. For example, the graphene may be present in a suspension, solution or dispersion of sheets in an amount of at least e.g. 0.01 mg/ml, up to concentrations of 10 mg/ml. The preferred solvent is tetrahydrofuran (THF) but other embodiments include N-methyl-2-pyrrolidone (NMP), Dimethylacetamide (DMAc), Dimethylformamide (DMF).

It is thought that the width and length dimensions of the charged graphene sheet for use in the invention are not particularly limited for the operation of the present invention. However, preferable dimensions may be of the order of microns, such as 10 microns or less.

Preferably, where the graphenide is provided as a suspension, solution or dispersion of graphene sheets, the sheets are monodisperse. That is, the suspension, solution or dispersion in which the individual graphene sheets are comprised all have essentially the same dimensions, i.e. a standard deviation of less than e.g. 20%, less than 15%, less than 10% or most preferably less than 5%. However, it is also possible to use polydisperse solutions in the operation of the invention.

The graphenide used in the present process may be provided by the methods reported in e.g. U.S. Pat. No. 9,255,008 B2, the contents of which are incorporated herein by reference in their entirety.

The charged graphene acts as a reducing agent in the formation of the nanoparticles. The graphene acts as a support for the nanoparticles in the graphene/nanoparticle composite material.

In some cases, the charge on the graphene can be completely exhausted by the reduction of the metal to where the graphene sheet is substantially neutral. However, reactants can be added in a stoichiometric ratio where the charge on the graphene is greater than the charge required to reduce the metal salts provided. In this case, the graphene sheet will maintain some charge on its surface following formation of nanoparticles. This charge could be exploited via several electrical methods such as electroplating the graphene sheet with the metal particles or reducing different particles on the graphene sheet where charge still remains.

Nanoparticles

The present application uses the word "nanoparticle", to emphasize that the particles formed on the graphene sheet are most appropriately measured on the nanometre-scale. Accordingly, the word "nanoparticle" refers to particles having a size of less than 1 micron. Preferably, as used herein, the size of the nanoparticles is about 20 nm or less, preferably 10 nm or less such as 5 nm or less or 2 nm or less. Preferably, the size is larger than about 0.2 nm, preferably larger than about 0.5 nm, preferably larger than about 1 nm. Preferably, the nanoparticles have a size in the range of between about 0.5 nm and about 20 nm, between about 0.5 nm and about 10 nm, between about 0.5 nm and about 10 nm or between about 1 nm and 10 nm. The word "size" in this context refers to a maximum dimension e.g. diameter, where the particles are spherical, or the length/width where the particles are non-spherical.

The nanoparticles prepared according to the present invention are formed with a narrow size distribution range. This is advantageous because e.g. it allows more accurate prediction of the surface area available for catalysis. The particle size distribution can be 95% between 1-10 nm, and most preferably 95% between 1-4 nm. Narrow, Gaussian size distributions imply a significant reduction in agglomerated particles typically found in the log-normal particle size distributions for most standard reduction techniques.

Preferably, about 99.7% of nanoparticles have a size of about 10 nm or less. Preferably, about 98% of nanoparticles have a size of about 5 nm or less. Preferably, about 95% of nanoparticles have a size of about 4 nm or less. Preferably, substantially all of the particles, such as 99% or more, have a size in the range of 1 to 4 nm, and particularly up to 3.5 nm. This preferred range is especially advantageous for certain applications such as those involving repeated cycling of the catalysts.

The word "nanoparticle" should not be construed as limiting on the shape of the particle produced. While the nanoparticles are expected to have a generally spherical shape, this may vary and accordingly no limitation is placed on this aspect.

The nanoparticles provided herein are believed to be formed from their metal salts because the charged graphene acts as a reduction agent.

The nanoparticles comprise metal, in particular a transition metal. In some instances, the transition metal nanoparticles comprise one or more of Pt, Pd, Ru, Ir, Rh, Os, Ni, Cu, Ti, Zn, Au, Ag and/or Co. In some instances, the transition metal nanoparticles comprise one of Pt, Pd, Ru, Ir, Rh, Os, Ni, Cu, Ti, Zn, Au, Ag and/or Co. In some instances, the transition metal nanoparticles consist of one of Pt, Pd, Ru, Ir, Rh, Os, Ni, Cu, Ti, Zn, Au, Ag and/or Co. In each of these cases, preferred metals include Pt, Pd, Ru, Ir, Co, and Ni and combinations of these. The most preferred metal is Pt.

In some instances, the nanoparticles comprise metal alloys. The nanoparticles can be alloys of any combination of Pt, Pd, Ru, Ir, Rh, Os, Ni, Cu, Ti, Zn, Au, Ag and Co. Preferably, the nanoparticles are alloys of Pt and would include Pt and Ir, Pt and Pd, Pt and Ru, Pt and Co and Pt and Ni. Preferably, the nanoparticles are alloys of Pd and would include Pd and Pt, Pd and Ir, Pd and Ru, Pd and Co, and Pd and Ni.

In some instances, a graphene sheet will comprise combinations of single-metal nanoparticles such as nanoparticles of Pt and nanoparticles of Pd in a preferred embodiment.

In some instances, a graphene sheet will comprise core-shell nanoparticles familiar to those skilled in the art. In one preferred embodiment the nanoparticle the nanoparticle will comprise a core of Pd and a shell of Pt. Other embodiments include a core of Co with a shell of Pt or a core of Cu with a shell of Pt.

The nanoparticles prepared according to the present invention have a good homogeneity of distribution. That is, there is a narrow distribution of both particle size diameter of the nanoparticles, and of nearest neighbour distance between the nanoparticles across the support. That is, the nanoparticles are uniformly distributed across the support as is shown in e.g. FIGS. 2(b) and 2(d).

Figure 2:
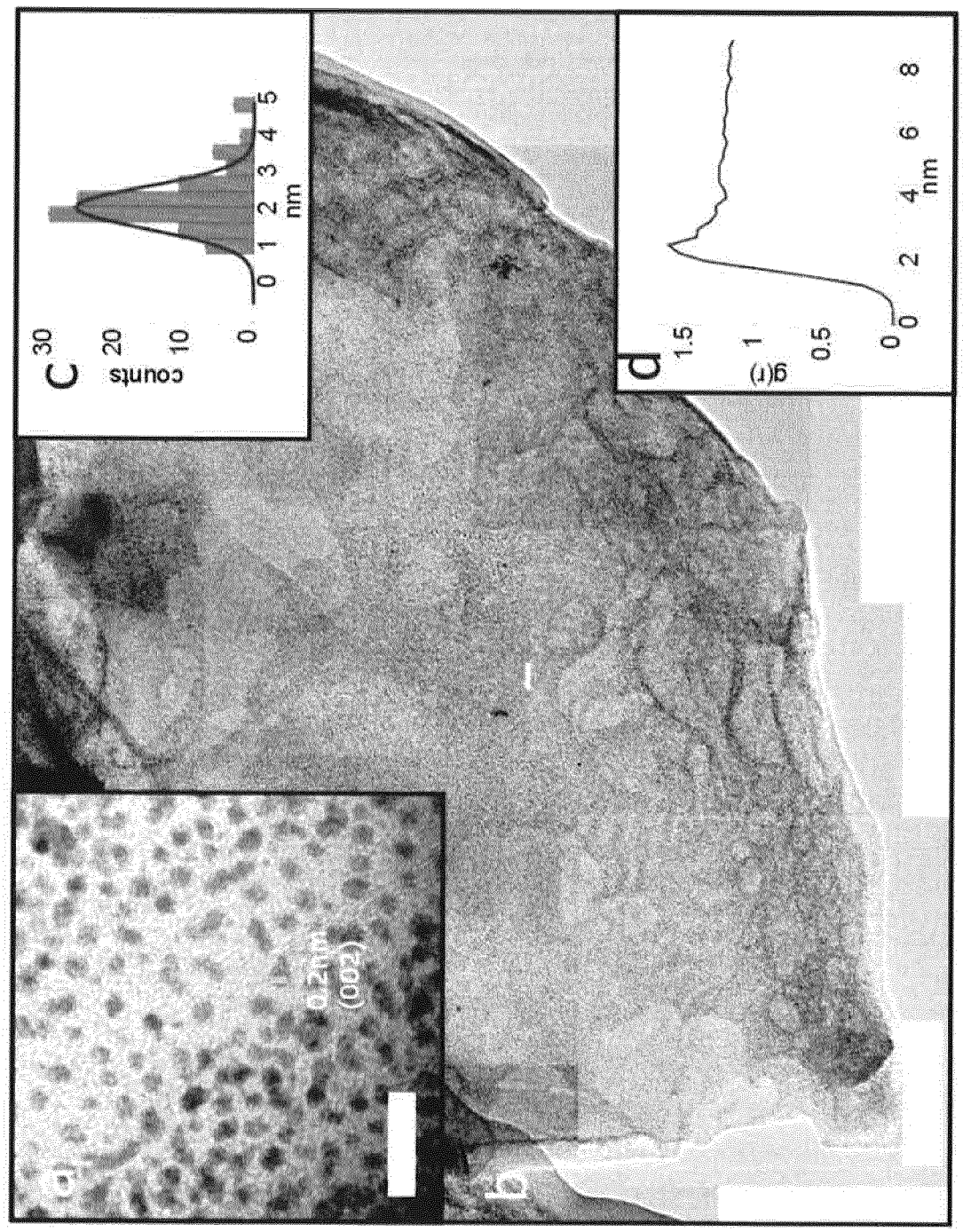
FIG. 2 shows (b) a composite transmission electron microscopy (TEM) image of platinum nanoparticles supported on a graphene sheet as prepared by the method of the present invention. The image is made up from a combination of smaller images of the same platelet. Scale bar=100 nm. This image was taken prior to cycling testing. Insert (a) is a close up TEM image of the graphene supported Pt nanoparticles of (b). Scale bar=10 nm. Also shown is the crystallographic d-spacing at (002), 0.2 nm. Insert (c) is a histogram of the diameter of 100 nanoparticles from this image. Insert (d) shows the radial distribution function g(r) against distance (nm). This demonstrates the equivalent distances between nearest first neighbour particles and nearest second neighbour particles.
Figure 3:
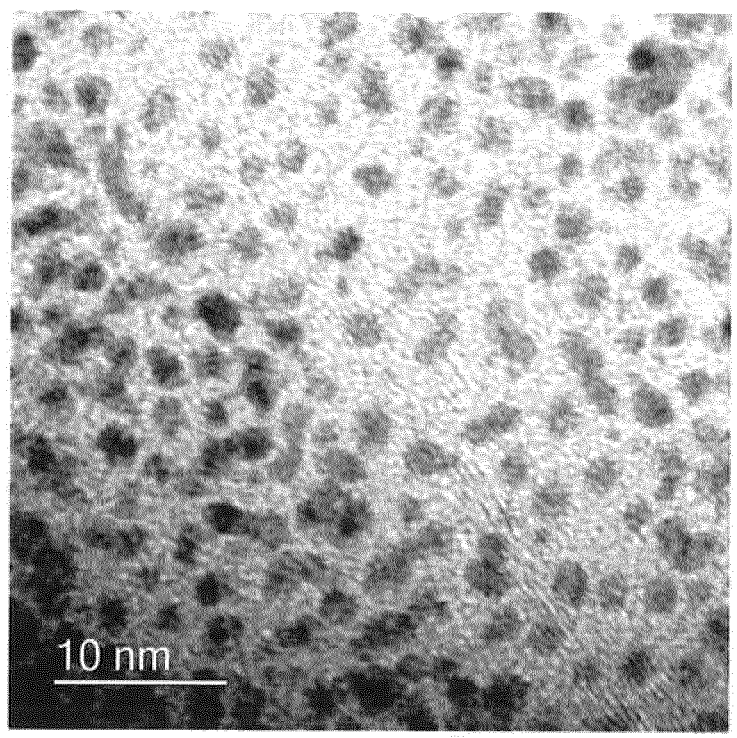
FIG. 3 is an enlarged TEM image of the graphene supported Pt nanoparticles of FIG. 2(a). Scale bar=10 nm.

This can be seen in FIGS. 2, 3 and 5. FIG. 2 in particular shows that nanoparticles are distributed substantially homogeneously across the surface of a graphene sheet.

Figure 5A:
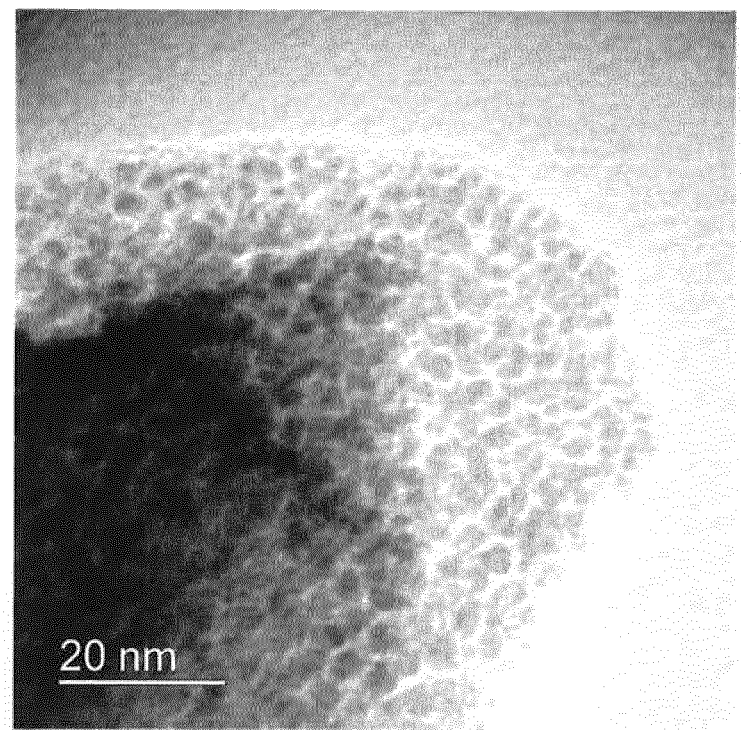
FIG. 5A is a close up TEM image of graphene supported Ni nanoparticles. Scale bar=20 nm.

Agglomeration is minimal, as emphasized in FIGS. 3A and 5A, which show that many of the nanoparticles produced are separated by a gap.

Figure 5B:
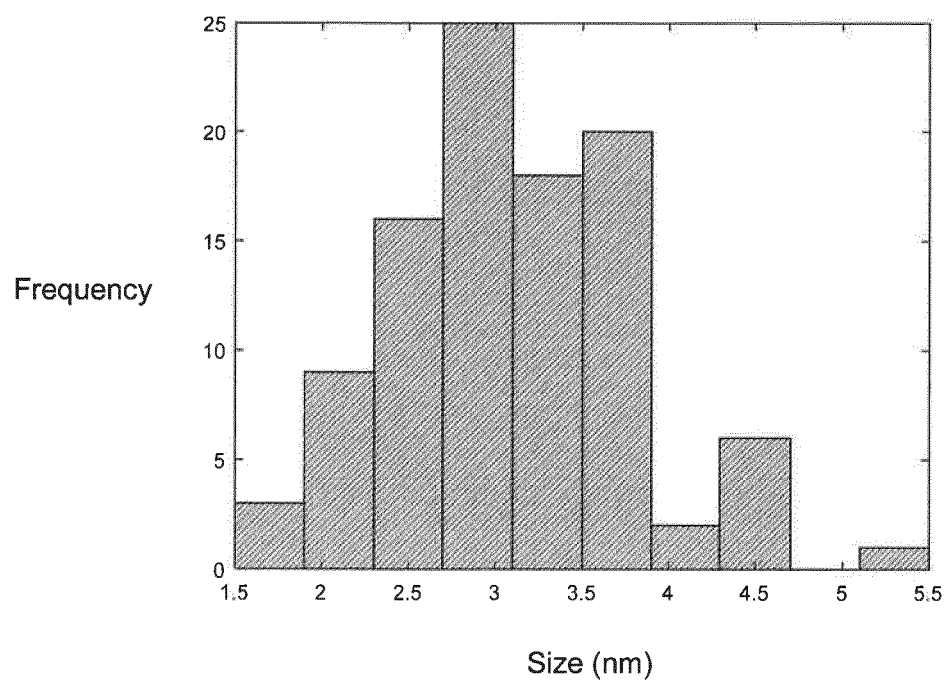
FIG. 5B is a histogram of the diameter of 100 nanoparticles from this image.

FIG. 2(c) shows that the Pt nanoparticles range in size from about 1 to about 5 nm, with the majority having a size of between 2 and 2.5 nm. The Gaussian fit shows the average diameter to be 2.1 nm with a standard deviation of 0.57 nm. FIG. 5B shows that the Ni nanoparticles range in size from about 1.5 to about 5.5 nm, with the majority having a size between about 3 and 3.5 nm. In fact, the data suggests a 3.06 nm mean particle size distribution with a standard deviation of 0.73 nm. Thus, the nanoparticles produced by the invention are small and have a narrow size range relative to disclosures in the prior art. Those skilled in the art will realise this is a significant improvement and non-obvious how to reproduce these results.

The distribution of nanoparticles across the graphene surface is not particularly limited. In some instances, the nanoparticles may be spaced apart by up to 3 nm, up to 2 nm or up to 1 nm or less. Such separation is most easily measured edge-to-edge using TEM images.

The density of nanoparticles is not particularly limited and can be determined by a skilled person using e.g. TEM images.

The nanoparticles prepared on the support according to the present invention advantageously show minimal agglomeration. This allows a large catalytic surface area to be maintained and thus improves efficiency of the ratio of catalytic material to catalytic output.

Methods

In general, the method of the present invention comprises contacting a graphene sheet having a negative charge with one or more transition metal salt or salts. The reaction of the graphene sheet with the transition metal salt or salts, forms transition metal nanoparticles distributed across the surface of the graphene sheet. After the reaction, the graphene sheet will lose some of its original charge.

As used herein, "providing a graphene sheet having a negative charge" includes obtaining the graphene sheet having a negative charge directly from e.g. commercial sources (made from a ternary GIC precursor). It also encompasses preparation of the negatively-charged graphene from graphite e.g. using the methods described herein and elsewhere.

The graphene sheet having a negative charge is usually provided in the form of a dispersion, solution or suspension, for example as set out in U.S. Pat. No. 9,255,008. It can be provided in any suitable polar aprotic solvent, including THF, NMP and DMF, DMAc. THF is the most preferred solvent. The provided graphene sheet can be provided in any suitable concentration. Preferably, the concentration is between 0.01 mg/ml and 10 mg/ml.

The transition metal salt is usually provided in the form of a solution or suspension.

The transition metal salt contains a metal ion which corresponds to the transition metal that is desired in the nanoparticles. Accordingly, preferred metal ions include Pt, Pd, Ru, Ir, Rh, Os, Ni, Cu, Ti, Zn, Au, Ag and/or Co. A particularly preferred metal ion is Pt.

The counterion of the transition metal salt is not particularly limited. The counterion may for example include a halide, such as a monohalide, dihalide, or hexahalide. It may be an acetate or a nitrate. Particular examples include chloride salts and bromide salts.

Preferred transition metal salts include platinum chloride, chloroplatinic acid, sodium hexachloroplatinate, nickel acetate and ammonium hexachloroplatinate.

These salts may be used alone or in combination. When used in combination, the inventors believe that the salts can form separate single element nanoparticles on the same sheet.

Accordingly, the inventors propose an embodiment in which a first metal salt is added in an amount below the stoichiometric charge on the graphene sheet required to reduce the metal salt. A second metal salt different to the first metal salt is introduced to the graphene sheet so that the metal ions of the second salt are reduced by the remaining charge. This will form separate single element nanoparticles on the same sheet.

When used in combination, under appropriate conditions, the resulting nanoparticles may comprise transition metal alloys.

The inventors also propose another embodiment in which a first metal salt is introduced to the charged graphene sheet and reduced as described. A second metal salt is subsequently introduced, optionally in combination with a surface modifying agent. The second metal salt is then reduced on the surface of the first metal salt nanoparticle forming a core-shell structure on the graphene sheet. The reduction of the second metal salt can be carried out in accordance with standard practices (e.g. using a reducing agent such as sodium borohydride) if desired.

Thus, when used in combination and under appropriate conditions, the nanoparticles may comprise core/shell nanoparticles of the transition metals i.e. one transition metal forms the core and a second transition metal forms the shell.

Preferred combinations of salts include those containing metal ions including Pt, Pd, Ru, Ir, Rh, Os, Ni, Cu, Ti, Zn, Au, Ag and/or Co.

The concentration range of metal salt present in the graphene solution/dispersion/suspension will vary according to how much material can be dissolved or suspended in the liquid, but a suitable range is 0.00001 M to 10 M.

The temperature at which the graphene sheet and the transition metal salt are brought into contact can be any suitable temperature. Useful temperature ranges include those at which solvents are in liquid form e.g. −110° C. to 205° C. Particularly preferred are temperatures of 30° C. or lower. For ease of processing, room temperature (usually taken as about 20° C.) is preferred. These temperatures are particularly advantageous because they are lower than the temperature at which other catalysts are prepared and therefore keep costs down.

The pressure at which the graphene sheet and the transition metal salt are brought into contact is not particularly limited. This may be done at atmospheric pressure.

Preferably, the graphene sheet and transition metal salt are brought into contact in an inert environment (i.e. low oxygen and water content, for example $H_2O<0.1$ ppm, $O_2<0.1$ ppm).

Preferably, the graphene sheet and transition metal salt are contacted for several hours. The precise time is not particularly limited, but can be for example up to 2 days, 12 hours, up to 7 hours or up to 5 hours.

The inventors have found that sonicating a charged graphene dispersion with the transition metal salt provides particularly good results. The sonication can last e.g. for up to 2 hours, up to 1 hour or up to 30 minutes. The same benefits can be achieved by actively stirring the dispersion instead of sonication. The stirring can last e.g. for up to 4 hours, up to 2 hours, up to 1 hour or up to 30 minutes.

The method can involve the step of flocculating the graphene sheets which are supporting transition metal nanoparticles to form a stack. It is believed that flocculation begins almost immediately as a diffusion mediated process. Full sedimentation transpires on a timescale approximately the order of hours. After such a time period, the stacks may resemble a powder. It is possible to observe using TEM that the powder-like materials are restacked sheets of graphene covered with Pt nanoparticles. They may be which are rotationally disordered (i.e. they are not lined up in the XY plane as in graphite). In other embodiments, they may be rotationally ordered. Such powder-like materials may have an advantage over liquid materials insofar as they may be practically easier to deposit onto electrodes.

One preferred approach to preparing graphene on a large scale is called liquid phase exfoliation. In this method, graphite is exfoliated into graphene sheets in the medium of a liquid. This forms graphene suspended or dispersed within the liquid. An advantage of this route is that such dispersions or suspensions can be used to efficiently manipulate the graphene into applications in industrially scalable way. This technology is described in, for example, U.S. Pat. No. 9,255,008 B2. Here, an electronic liquid is used for dispersing the graphite into graphene sheets. The graphene sheets produces by this method are non-agglomerated, unfolded and unscrolled. These methods are suitable for providing the graphene sheet having a negative charge according to the invention.

Figure 1:
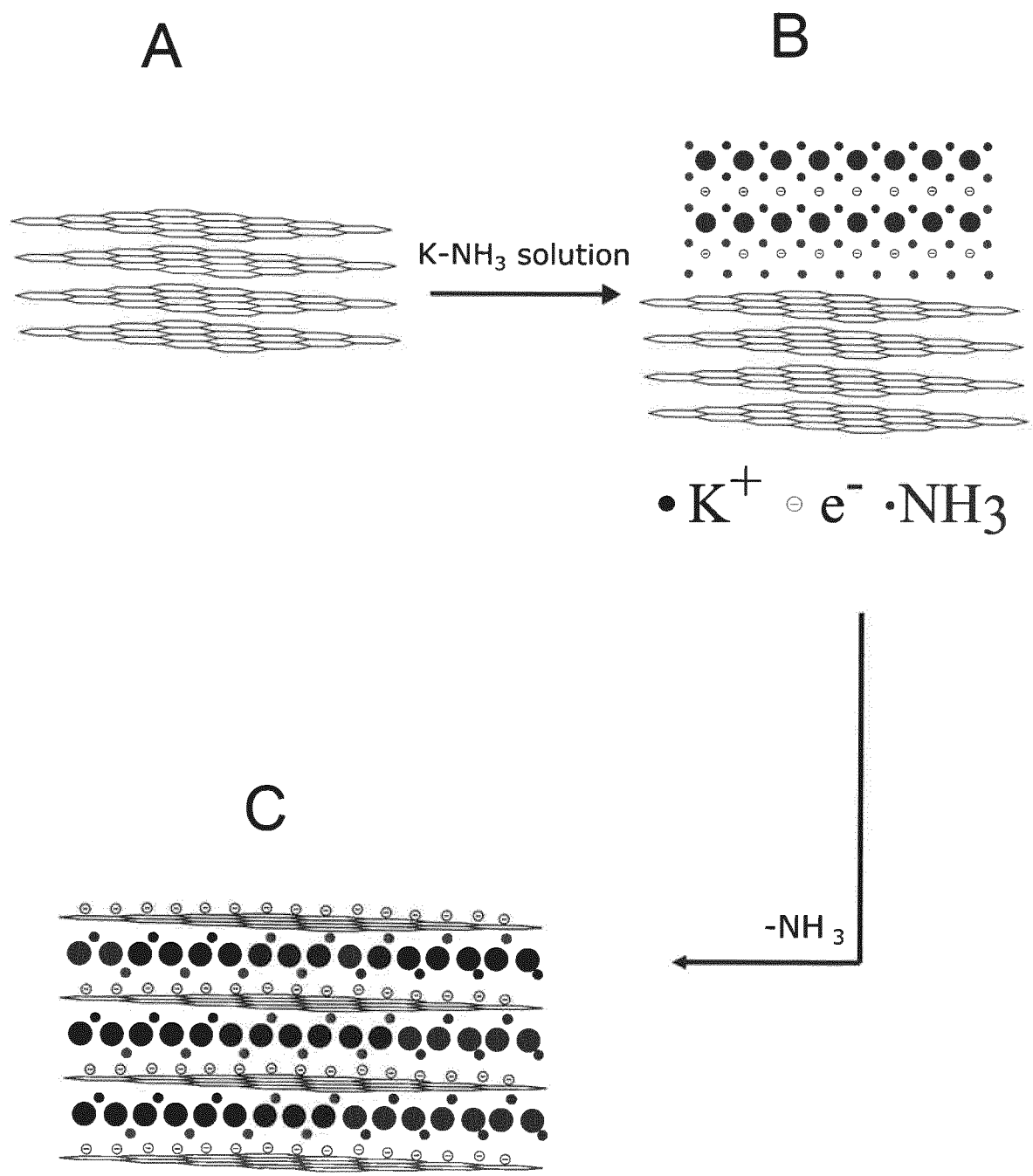
FIG. 1 is a schematic illustration of a method of producing a graphite intercalation compound according to the present invention.
Figure 1:
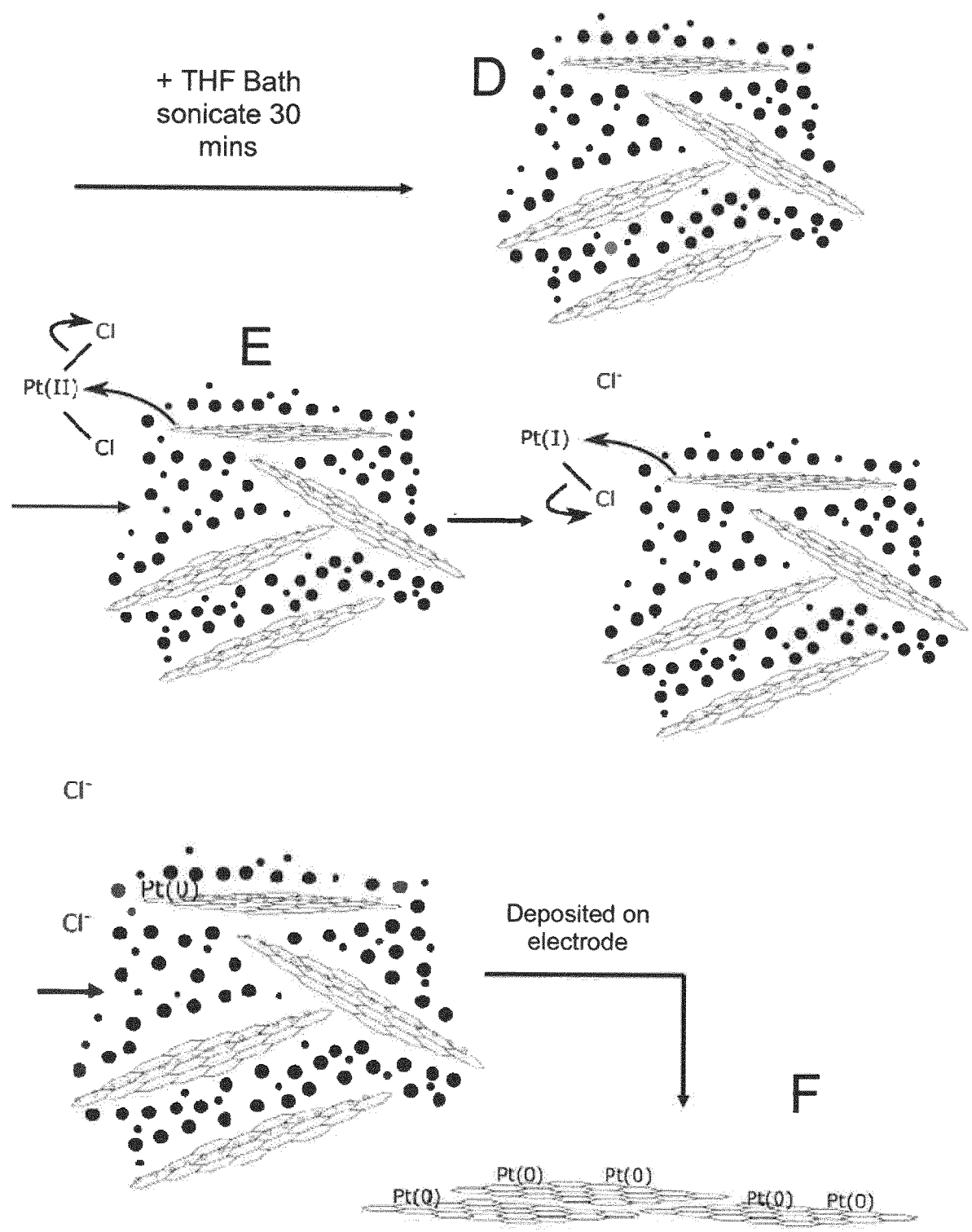

FIG. 1 shows a schematic overview of a process of preparing a GIC used in the invention. Graphite, initially having a layered sheet structure, is initially intercalated with an electropositive metal. This can be done with a solution of K—$NH_3$ at concentrations of 0.01 to 20 MPM (moles percent metal). Other kinds of electronic liquids, such as e.g. metal-methylamine solutions or a metal-ammonia/methylamine solution can be used.

For example, the kind of polar aprotic solvents for the intercalation step can be varied, e.g. ammonia, methylamine or a combination of both or the kind of metal ion can be varied, e.g. Li, Na, K, Rb, Cs, Fr, Sr, Eu, Ca, Ba, Mg.

Additionally graphite can be intercalated electrochemically, by vapour transport, by immersion in molten alkali metal or by other liquid charge transfer methods such as via sodium-napthalide. Binary GICs created in this way can be made into tertiary GICs by exposure to amine/ammonia liquid or amine/ammonia vapour.

The kind of polar aprotic solvents for the exfoliation step can also be varied, for example, THF, NMP, DMAc, and DMF and others can be used.

In the invention, providing the graphene sheet having a negative charge preferably comprises preparing the graphene by a method comprising dispersing graphite with an alkali metal or alkaline earth metal in the presence of an amine or ammonia solvent.

Preferably, the graphite is dispersed with sodium or potassium. Preferably, the solvent is ammonia. Particularly preferably, the graphite is dispersed with sodium or potassium and the amine solvent is ammonia. This tertiary graphite intercalation compound (GIC) has advantages including scalability and homogeneity.

As FIG. 1 shows, an exemplary method of preparing the nanoparticles according to the invention includes adding K—$NH_3$ solution to graphite. This forms a K—$NH_3$ graphite intercalation compound (GIC). That is, a GIC is formed, within which the negatively charged graphene sheets are separated by positively charged K ions and $NH_3$. The GIC is shown as having an ordered structure in which the graphene sheets remain in layers and the K ions and $NH_3$ molecules are spaced from one another. It is understood that this is simply representative and not limiting. The layered structure of the GIC can be disrupted, for example by adding a polar aprotic solvent such as THF, NMP, DMF or DMAc. Subsequently, in the method shown in FIG. 1, sonication is performed to separate the layers. Sonication or stirring can optionally be applied to the mixture. This produces charged graphene (graphenide) in dispersion in the chosen solvent (THF is exemplified in FIG. 1). The resulting solution of charged graphene is used to prepare the graphene/nanoparticle composite. To the dispersion is added a metal salt (such as $PtCl_2$, as shown in FIG. 1). The metal salt is believed to be reduced by the charged graphene. In the schematic drawings of FIG. 1, this is shown in two stages (separate removal of each chlorine atom) but this should be understood to be only representative and not limiting. The metal nanoparticles form on the surface of the charged graphene. The composite material can be used in a number of applications: deposition on an electrode is indicated as an example in FIG. 1.

Addition of a salt of the requisite transition metal is added to the graphenide dispersion. In FIG. 1, $PtCl_2$ is used but other similar kinds of salt could be included. A reducing agent, such as sodium borohydride is not needed. Indeed, it is preferred that a reducing agent (other than the tertiary graphenide) is not added to the graphenide/transition metal salt solution. The addition of a standard reducing agent will require additional cleaning of the final catalyst product to produce a desirable catalyst and reducing agents tend to produce less homogeneous particle size distributions.

The graphenide is believed to act as a reducing agent. The metal therefore forms as a nanoparticle on the surface of the graphenide. The formation of the nanoparticles neutralises charge on the graphenide, so that the result is a graphene/nanoparticle composite material. The potassium ions pair with the chloride ions from the $PtCl_2$, to provide KCl.

Over time the composite deposits on the bottom of the reaction flask. It can be washed with a suitable solvent such as water. The washing process removes the metal halide by-product, in the present example KCl.

In FIG. 1, the product is shown as comprising overlapping sheets of graphene. It will be understood that this is representative and not limiting.

Catalysis

The graphene/nanoparticle composite materials prepared according to the present invention can have a wide range of industrial application. In particular, it is considered that they will be useful in catalysis applications. That is, the products of the methods described herein, and in particular the graphene/nanoparticle composites, can be used as catalysts.

The kinds of catalytic reactions in which the catalysts will be used will depend on the nature of the transition metal nanoparticle. For example they can be used in reduction of $NO_x$; oxidation of CO to $CO_2$; oxidation of hydrocarbons to $CO_2$ and water; hydrogen oxidation reaction; oxidation reduction reaction; hydrogen evolution reaction; oxygen evolution reaction; the chlor-alkali process; nitric acid production; monoethylene glycol synthesis; hydrogenation and dehydrogenation reactions; preparation of anti-microbial coatings; and reinforced fibre glass manufacture.

The composite graphene/nanoparticle material prepared according to the present invention has advantages. Durability cycles were done between 0.6 V and 1 V at 50 $mVs^{-1}$ in 0.1M $HClO_4$. At different intervals a CV between 0.025 V and 1.2 V was taken at 100 $mVs^{-1}$. This was compared directly to a commercial catalyst, HiSpeC 4000, cycled between 0.6 V and 1 V at 50 $mVs^{-1}$ in 0.1M $HClO_4$ at different intervals a CV between 0.025 V and 1.2 V was taken at 100 $mVs^{-1}$. Quantitatively, it was observed that the composite materials prepared according to the present invention show improved stability under potential cycling compared to commercial catalysts. Without wishing to be bound by theory, the inventors theorize that this results from the interaction between the nanoparticle and the support. In turn, the inventors further theorize that this is a function of the charge and the manner in the way the metal salt reduces to metal on the support.

Linear sweep voltammograms (see FIG. 7) show comparable activity of graphene supported transition metal nanoparticles prepared according to the invention compared with commercially available materials.

Figure 8:
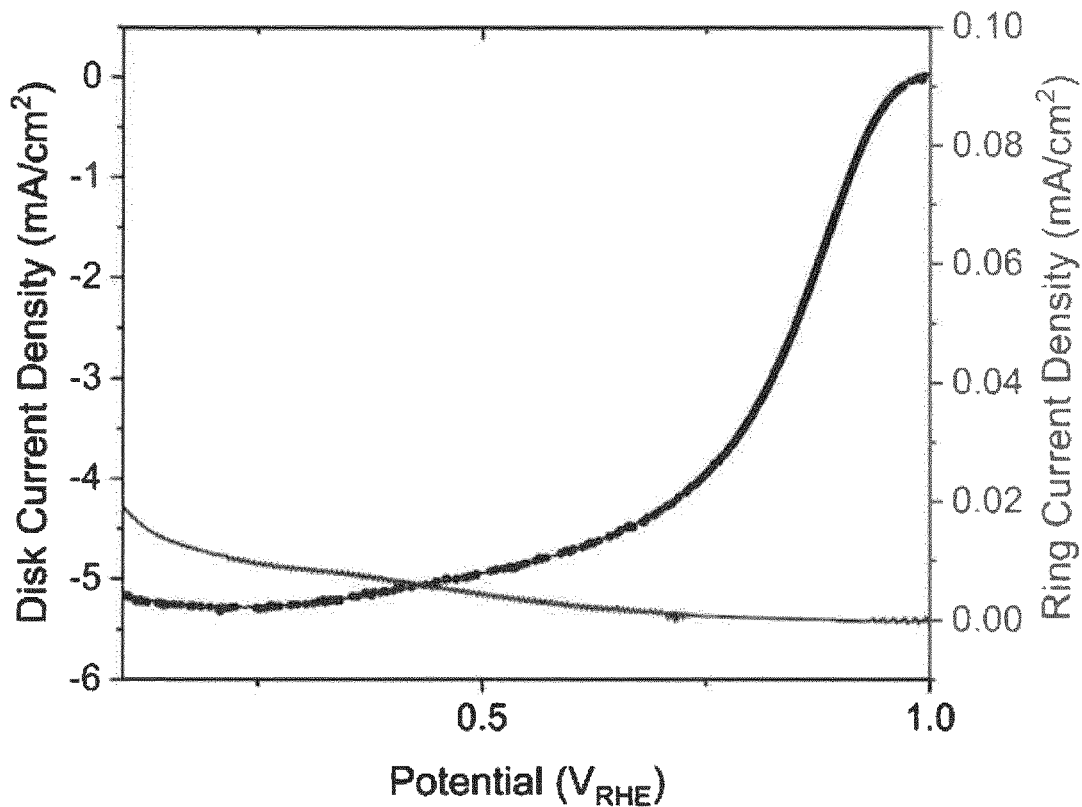
FIG. 8 shows a linear sweep voltammogram obtained using a rotating ring-disk experiment for graphene supported nanoparticles prepared according to the present invention. This was performed in $HClO_4$ at a scan rate of 20 mV/s. The dark line (curving upward as viewed from left to right) shows the disk current density and the lighter line (curving slightly upwards as viewed from right to left) shows the ring current density.
Figure 9:
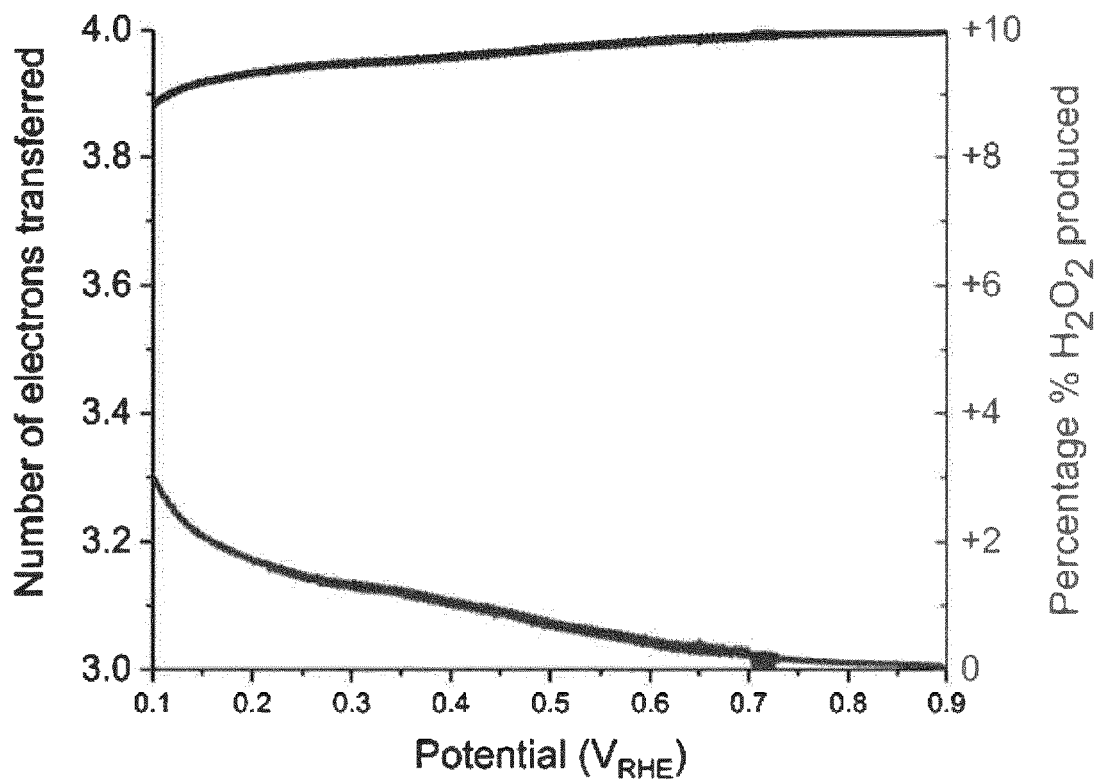
FIG. 9 shows the number of electrons transferred and $H_2O_2$ yield calculated from the data of FIG. 8. The dark line (upper) shows the number of electrons transferred and the lighter line (lower) shows the percentage of $H_2O_2$ produced.

FIGS. 8 and 9 support that the materials prepared according to the present methods are suitable for use as efficient catalysts, for example (FIG. 9) shows the low levels of $H_2O_2$ production and that the reaction proceeds mainly via the preferred 4 electron pathway.

While the invention has been described in conjunction with the exemplary embodiments described above, many equivalent modifications and variations will be apparent to those skilled in the art when given this disclosure. All options and preferences of all aspects may be combined together unless expressly stated otherwise. Accordingly, the exemplary embodiments of the invention set forth above are considered to be illustrative and not limiting. Various changes to the described embodiments may be made without departing from the spirit and scope of the invention.

All references referred to above are hereby incorporated by reference.

EXAMPLES

Production of Charged Graphene Dispersion

The method of preparing the charged graphene dispersion is based on the method described in US 2014/0377159. Graphite (~325 mesh, Sigma) was evacuated down to a pressure of $10^{-6}$ mbar and outgassed at 400° C. until base pressure of the pump (<$10^{-6}$ mbar) was achieved. This was then loaded into a glove box ($H_2O$<0.1 ppm, $O_2$<0.1 ppm) and placed in a sealed reaction vessel with potassium metal (Sigma, 99.95%) at a K:C ratio of 1:24. This reaction vessel was then placed onto a high integrity gas manifold and evacuated to $10^{-6}$ mbar. Enough anhydrous $NH_3$ was condensed onto the reaction vessel at −60° C. until the characteristic blue colour of the dilute (<1 MPM, moles percent metal) metal-ammonia solution was seen. When the liquid had turned colourless, indicating that intercalation had been completed the $NH_3$ was cryopumped from the sample, leaving a light blue powder. This metal-ammonia GIC was then transferred to the glove box where THF was added at a concentration of 1 mg ml$^{-1}$. This was sealed with Parafilm® and transferred outside of the glove box and sonicated for 30 mins, keeping the temperature below 30° C. This liquid was allowed to settle in the glove box for 72 hours before the supernatant extracted for use.

Production of $PtCl_2$ Dispersion $PtCl_2$ was added to THF inside the glove box at a concentration of 2.6 mg ml$^{-1}$. This was then sonicated for 30 mins keeping the temperature below 30° C.

Reaction of Graphene Dispersion with $PtCl_2$

The charged graphene liquid was added to the $PtCl_2$ dispersion in the glove box in stoichiometric excess. This was left to react under gentle stirring for 4 hours. Once the reaction had been completed a fine black powder settled to the bottom of the reaction vessel.

Reaction of Graphene Dispersion with Nickel Acetate

Nickel acetate was added to THF at a concentration of 1 mg/ml. This was added to the supernatant of a 1 mg/ml graphenide in THF solution made from $KC_{24}NH_3$ GIC. The nickel acetate was added to the graphenide solution at a volume ratio of 0.0221:1.

Transmission Electron Microscopy (TEM)

All transmission electron micrographs (TEM) were taken on a Jeol JEM 2100 equipped with a $LaB_6$ source operated at 200 kV.

Results

The graphene/nanoparticle composite material was used to demonstrate utility as a catalyst, and compared to a commercially available Vulcan supported platinum catalyst HiSPEC400. The electrochemical measurements were carried out using a conventional three-electrode cell connected to an Gamry interface 1000 potentiostat/galvanostat. A Pt mesh was used as a counter electrode, and a hydrogen reference electrode (Gaskatel), joined to the main chamber via a Luggin capillary, was used as a reference electrode. All measurements were carried out 0.1 M $HClO_4$ under $N_2$ gas flow.

For the commercially made HiSpec 4000 catalyst, a glassy carbon (GC) electrode with a geometric surface area of 0.1963 cm$^2$ was used as a working electrode, which was polished with 0.1 μm alumina (Buehler) followed by washing in deionised water before each use. A catalyst ink was made by mixing ethanol with 0.1% nafion and ultrasonicating with the HiSpec 4000 catalyst and deposited dropwise onto the glassy carbon in air at room temperature, resulting in a typical Pt loading of 20 μg/cm.

The graphene solution consisted 20 ml of 1 mg/ml a $KC_{24}NH_3$ in dry THF. This was sonicated in a bath sonicator in an argon environment for 30 mins. The supernatant was taken.

For the platinum reduction, $PtCl_2$ was added to THF inside the glove box at a concentration of 0.01 M (2.659 mg ml$^{-1}$). This was then sonicated for 30 mins. The supernatant of the graphene solution was taken and $PtCl_2$ dispersion added 400 times in excess stoichiometrically, assuming 100% yield of graphene production. This was left to react under gentle stirring for 4 hours. 20 μl of solvent containing the Pt/graphene composite was added dropwise to a glassy carbon (GC) electrode with a geometric surface area of 0.1963 cm$^2$. This was followed by the dropwise addition of 12 μl of 0.02% Nafion ionomer solution in isopropanol. This electrode was used as a working electrode, which was polished with 0.1 μm alumina (Buehler) followed by washing in deionised water before each use.

Cyclic voltammetry was performed on both electrodes at a rate of 50 mV/s between 0.6 V and 1 V versus SHE.

At intervals Cyclic Voltammograms were taken between 0.025 V and 1.2 V at a rate of 100 mV/s.

Figure 4A:
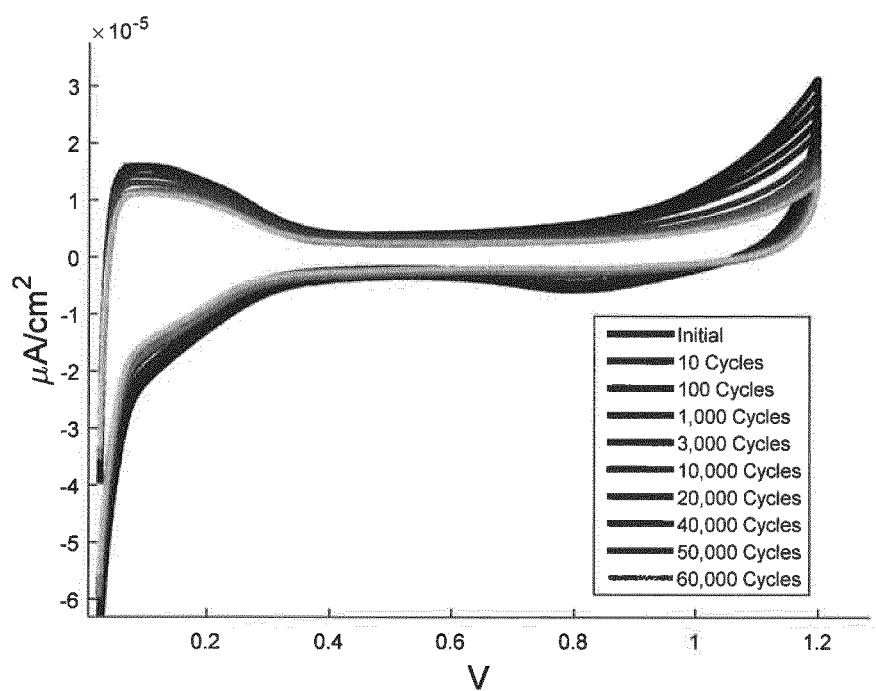
FIG. 4 shows cyclic voltammogram curves of platinum supported on a graphene sheet from the same material imaged in FIG. 2. These were taken over a number of cycles between 0.05 V and 1.2 V at 50 mV/s under $N_2$ for (A) HiSPEC400, a commercially available carbon black-supported platinum catalyst (the carbon black was a Vulcan XC-72R support material; (B) graphene-supported platinum nanoparticles prepared according to the method of the invention; (C) a comparison of the normalised electrochemical surface areas of (A) and (B).
Figure 4B:
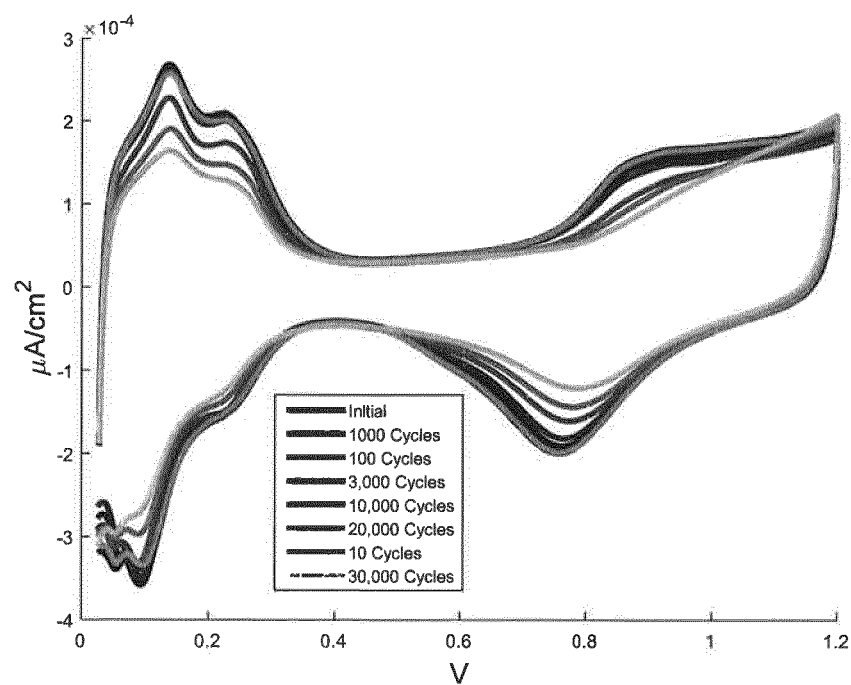
Figure 4C:
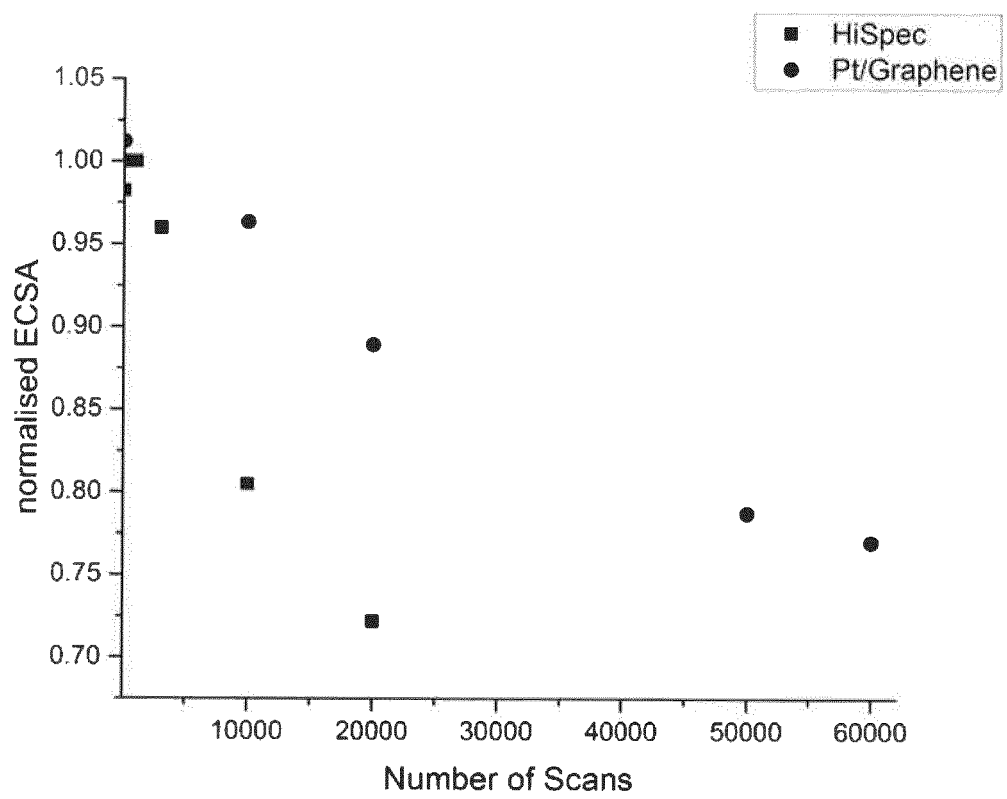

The results are shown in FIG. 4. FIG. 4A shows CV curves at intervals after cycling between 0.025 V and 1.2 V at 50 mV/s under $N_2$. The curves from the comparison material HiSPEC4000 are shown at FIG. 4B. The curves produced by the material prepared according to the present invention are shown at FIG. 4A. It can be seen that, from the cyclic voltammogramms, 22.8% of the electrochemical surface area of the platinum on graphene material is lost after ~60,000 cycles. By comparison, the HiSpec 4000 loses 20% of the electrochemical surface area after only 10,000 cycles under the same conditions. This can be seen clearly from the normalised data in FIG. 4C. Even after a substantially larger number of scans, the composite prepared according to the invention maintains its structure.

This supports the inventor's belief that the composite prepared according to the present invention is more durable, and shows reduced agglomeration of nanoparticles, compared to known nanoparticle/support materials.

FIG. 6e shows the change in ECSA calculated from the CV curves in FIG. 6d in the 1-1.6 $V_{RHE}$ range. In this range it can be seen that 19% of the electrochemical surface area of the platinum on graphene material is lost after 30,000 cycles. Under the same conditions it can be seen that 50% of the electrochemical surface area of the commercial HiSpec 4000 material is lost after 30,000 cycles.

This further supports the inventor's belief that the composite prepared according to the present invention is more durable, and shows reduced agglomeration of nanoparticles, compared to known nanoparticle/support materials.

The invention claimed is:

1. A method of preparing transition metal nanoparticles on a graphene support, the method comprising the steps of:
   providing a tertiary graphite intercalation compound comprising metal ions intercalated between graphene sheets such that the tertiary graphite intercalation compound comprises a graphene sheet having a negative charge and;
   contacting the graphene sheet with at least one transition metal salt; such that the contacting step causes reduction of the transition metal salt by the graphene sheet to form the transition metal nanoparticles;
   wherein the tertiary intercalation compound has a metal ion to carbon ratio of up to 1:10.

2. A method according to claim 1, wherein the at least one transition metal salt comprises a first transition metal salt that includes at least one of Pt, Pd, Ru, Ir, Rh, Os, Ni, Cu, Ti, Zn, Au, Ag, Co, or combinations thereof.

3. A method according to claim 2, wherein the first transition metal salt comprises Pt.

4. A method according to claim 1, wherein a plurality of transition metal salts are provided and reduced by the graphene sheet.

5. A method according to claim 1, comprising the step of flocculating the transition metal nanoparticles on the graphene support to form a stack.

6. A method according to claim 1, in which no additional reducing agent is used.

7. A method according to claim 1, in which the graphene having a negative charge is provided in the form of a solution or dispersion.

8. A method according to claim 1, wherein the at least one transition metal salt comprises a first transition metal salt and a second transition metal salt, wherein the first transition metal salt is present in an amount below a stoichiometric charge on the graphene sheet, such that the contacting step causes reduction of the first transition metal salt by the graphene sheet to form the transition metal nanoparticles which are first transition metal nanoparticles; and a second contacting step in which the graphene sheet is brought into contact with a second transition metal salt, the second transition metal salt comprising a different transition metal to the first transition metal salt, such that the second contacting step causes reduction of the second transition metal salt by the graphene sheet to form second transition metal nanoparticles.

9. A method according to claim 1, wherein the at least one transition metal salt comprises a first transition metal salt and a second transition metal salt, wherein the transition metal nanoparticles produced using the first transition metal salt are first transition metal nanoparticles; the method comprising a further contacting step following the formation of the first transition metal nanoparticles, the further contacting step comprising contacting the graphene sheet with the second transition metal salt; and reducing the second transition metal salt to form further transition metal nanoparticles comprising at least two transition metals on the graphene sheet.

10. A method according to claim 9, wherein the further transition metal nanoparticles comprise an alloy of the at least two transition metals.

11. A method according to claim 9, wherein the further transition metal nanoparticles are in the form of a core shell arrangement such that the transition metal of the first transition metal salt forms a core and the transition metal of the further transition metal salt forms a shell over the core.

12. A method according to claim 1, wherein the first transition metal salt is provided in an amount below a stoichiometric charge on the graphene sheet such that following the contacting step the graphene sheet comprising the transition metal nanoparticles retains some charge, the method further comprising providing a potential or current to the graphene sheet with the transition metal nanoparticles, and optionally electroplating the graphene sheet with the transition metal nanoparticles.

13. A method according to claim 1, wherein the tertiary graphite intercalation compound has a metal ion: carbon ratio of at least 1:100.

14. A method according to claim 13, wherein the tertiary graphite intercalation compound has a metal ion: carbon ratio of 1:24.

15. A composite material comprising Rail at least one transition metal nanoparticle on a graphene support obtained by the method of claim 1.

16. A composite material according to claim 15, comprising a graphene sheet having a first transition metal nanoparticle and a second transition metal nanoparticle formed thereon, wherein the transition metals of the first and second transition metal nanoparticles are different from each other.

17. A composite material according to claim 15, comprising a graphene sheet having a nanoparticle comprising an alloy of first and second transition metals formed thereon wherein the first and second transition metals are different from each other.

18. A composite material according to claim 15, comprising a graphene sheet having a core-shell nanoparticle formed thereon, the core of the nanoparticle comprising a first transition metal and the shell of the nanoparticle comprising a second transition metal wherein the first and second transition metals are different from each other.

19. A composite material according to claim 15, which is a graphene sheet having transition metal nanoparticles formed thereon, wherein the nanoparticles have an average size of less than 4 nm.

20. A suspension, dispersion or solution comprising the composite material of claim 15.

21. A catalyst comprising the suspension, dispersion or solution of claim 20.

22. A catalyst comprising the composite material of claim 15.

23. A catalytic reaction, comprising introducing a catalyst comprising the composite material of claim 15.

24. The catalytic reaction of claim 23, wherein the reaction is one or more of the following reactions: a reduction of NOR; an oxidation of CO to $CO_2$; an oxidation of hydrocarbons to $CO_2$ and water; a hydrogen oxidation reaction; an oxidation reduction reaction; a hydrogen evolution reaction; an oxygen evolution reaction; a, chlor-alkali process;

nitric acid production; monoethylene glycol synthesis; hydrogenation and dehydrogenation reactions; preparation of anti-microbial coatings; and reinforced fibre glass manufacture.

25. An article comprising a catalyst comprising the composite material of claim 15, wherein the article is an automotive catalyst, a fuel cell, an electrolyzer, a supercapacitor, a battery, or a sensor.

* * * * *